Nov. 3, 1959 P. M. G. TOULON 2,911,465

TELEVISION SYSTEMS

Filed May 22, 1952 6 Sheets-Sheet 1

INVENTOR.
P. M. G. TOULON
BY Moore and Hall
ATTORNEYS

Nov. 3, 1959 P. M. G. TOULON 2,911,465

TELEVISION SYSTEMS

Filed May 22, 1952 6 Sheets-Sheet 2

*INVENTOR.*
P. M. G. TOULON

*BY Moore and Hall.*
ATTORNEYS

Nov. 3, 1959 P. M. G. TOULON 2,911,465

TELEVISION SYSTEMS

Filed May 22, 1952 6 Sheets-Sheet 3

INVENTOR.
P. M. G. TOULON

BY *Moore and Hall*
ATTORNEYS

Nov. 3, 1959 P. M. G. TOULON 2,911,465

TELEVISION SYSTEMS

Filed May 22, 1952 6 Sheets-Sheet 4

INVENTOR.
P. M. G. TOULON

BY Moore and Hall

ATTORNEYS

Nov. 3, 1959 P. M. G. TOULON 2,911,465

TELEVISION SYSTEMS

Filed May 22, 1952 6 Sheets-Sheet 5

INVENTOR.
P.M.G.TOULON
BY
Moore and Hall
ATTORNEYS

INVENTOR.
P. M. G. TOULON
BY
*Moore and Hall*
ATTORNEYS

United States Patent Office 2,911,465
Patented Nov. 3, 1959

2,911,465

TELEVISION SYSTEMS

Pierre Marie Gabriel Toulon, New York, N.Y., assignor, by mesne assignments, to Moore and Hall, Washington, D.C., a partnership Application May 22, 1952, Serial No. 289,263

28 Claims. (Cl. 178—6.8)

This invention relates to devices for transmitting electric waves with reduced bandwidth to a remote location either by wire or by wireless transmission. It has especial value in transmitting television signals by wire or wireless, although the broader claims are not limited to television, as are the narrower claims. The invention is applicable to either color television or to black and white picture transmission.

The invention has as its primary object the transmission of electric waves to a remote location with reduced bandwidth, in an improved manner.

The invention is explained as applied to a television system, where it finds its maximum utility. Moreover, as will appear the narrower aspects of the invention are limited to television although the broader aspects are not.

If a line of a television picture is divided into groups of four dots and the amplitude of the dots in each group are compared with each other it will be found that in most pictures over 80% of the groups in any one line will be composed of four dots of equal amplitude. With this background my invention divides the wave into groups of say four dots per group. The wave is delayed by the time length of one group and recorded. A separate circuit determines if the amplitude of all of the four dots of the group was the same. If at the end of this determination it is found that there is no change in the amplitude the group is recorded as a unit (in other words as one impulse) whereas if the determination shows a change the group is recorded as four impulses. The recording speed is faster, preferably four times as fast, when the groups are recorded as four impulses than when they are recorded as a single impulse. The resultant recording is then read at constant speed, hence it is apparent that the transmission band is about one-fourth of the width of the band required for normal transmission of the original wave. Also recorded is a coarse recording where the average value of each group of four dots is recorded as a single dot. There is a third recording consisting of impulses that indicate whether or not there is any change in the amplitude of the dots of the groups. A switch is employed to shift either of the following to the output (1) a reading of the first and third named recordings or (2) a reading of the second-named recording. This switch is controlled by means which is actuated by the length of time required for reading the first-named recording. If the time required for that reading would be so long that the reading would exceed the length of a line then the switch connects the second-named recording to the output, otherwise the first-named recording is connected to the output.

At the receiver, the rate of the horizontal sweep is varied during the course of each sweep to account for the variations in the first named recording. Moreover, the intensity of the picture is changed as the sweep rate varies.

When the invention is applied to color television, three entire units such as are described below, may be used, one for each primary color.

This invention is an improvement upon other bandwidth compressing devices previously invented by me, such as those illustrated in the following copending applications: Ser. No. 144,715,, filed February 17, 1950, for : "Double Scanning," now abandoned in favor of continuation-in-part Ser. No. 409,936, filed February 12, 1954, for: "Television System Having Reduced Transmission Bandwidth"; Serial No. 166,013, filed June 3, 1950, for: "Compressed Television"; and Serial No. 221,553, filed April 18, 1951, for: "Television System Employing Memory Phosphors."

In the drawings:

Figure 1 is a schematic diagram of the transmitter. Since this figure was too large to fit on single sheet of drawing it has been divided into two Figures 1*a* and 1*b* which if taken together make up Figure 1. The wires A . . . J of Figure 1*a* connect to wires bearing similar letters on Figure 1*b*.

Figure 1A:
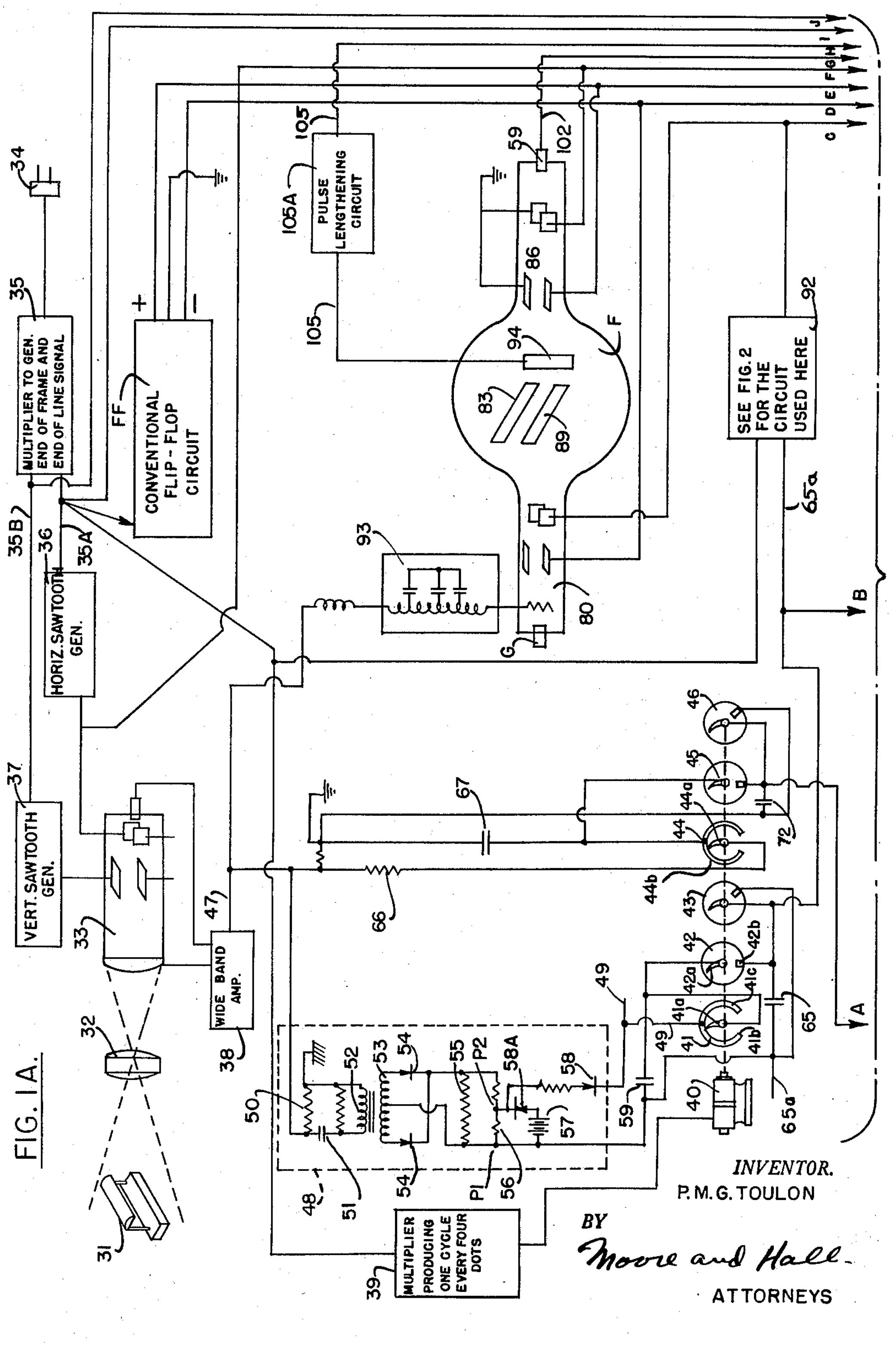

The object 31 to be televised acts upon conventional television transmitting tube 33 through lens 32. Power from the conventional domestic power source 34 of 110 volts at sixty cycles acts on coventional multiplier 35 which produces signals at its output **35*a* at the "end of line" frequency, as well signals at its output 35*b* at "end of frame" frequency. End of line signals on line 35*a* feed the conventional horizontal sawtooth generator 36 which in turn feeds the horizontal deflecting plates. End of frame signals on line 35*b* feed conventional vertical saw tooth generator 37 which in turn feeds the vertical deflection plates in the well known way. The output of television transmission tube 33 feeds conventional wide band amplifier 38. The structure described up to this point in this paragraph is in accordance with present day conventional practice. End of line signals on line 35*a* are multiplied to a value equal to one-fourth the dot frequency by multiplier 39 which in turn feeds synchronous motor 40 which makes one revolution for every four dots televised. Synchronous motor 40 drives switches 41 to 46 incl., at synchronous speed. Output 47 from amplifier 38 is fed to device 48 which produces no signal in its output 49 as long as the amplitude of the dots being received on its input 47 are all the same. However, device 48 produces a positive pulse in its output 49 whenever one of the dots received on input wire 47** differ in amplitude from its preceding pulse.

Device 48 operates as follows. Signals on line 47 appear across shunt resistor 50. Any varying potential produces a current through condenser 51 and transformer primary 52. The output of secondary 53 is passed through full wave rectifier 54 and fed across resistors 55 and 56. Battery 57 in cooperation with resistor 56 and rectifier 58 and 58*a* acts as a limiter. As the potential across resistor 56 rises from zero, the amplitude of the current flowing in rectifier 58 increases, and charges condenser 59. However, when the potential between points $P_1$ and $P_2$ exceeds that of battery 57 it can go no higher because rectifier 58*a* comes into action and limits the potential between points $P_1$ and $P_2$ to the potential of battery 57. Hence the device 48 may be summarized as a conventional transformer which feeds a conventional full wave rectifier which in turn feeds a conventional limiter. Any of many alternate circuits are available and may replace the transformer, rectifier, or limiter of device 48.

Moving contact arm 41*a* is touching point 41*b* of the stationary contact strip 41*c* at the beginning of each group of four dots and arm 41*a* rotates clockwise thus maintaining contact with strip 41*c* throughout nearly the entire duration of the group of four dots. However at the very end of the group, arm 41*a* ceases to contact strip 41*c* during which interval the output of device 48 no longer is impressed across condenser 59. During said interval, contact arm 42*a* is in contact with contact point 42*b* and the condenser 59 is then discharged across condenser 65.

Just prior to each time that arm 42*a* reaches contact 42*b*, the condenser 65 is shorted and discharged by switch 43.

Summarizing the conjoint operation of device 48, plus switches 41 to 43, and condenser 65, it can be said that whenever there is a group of four dots all of the same amplitude, no charge will appear on condenser 65. On the other hand, if any dot in a group of four differs in amplitude from any other, a charge will appear on condenser 65.

Passing now to switch 44 we see that throughout about the first 90% of the period of a group of four dots there is a circuit from line 47, very high resistance resistor 66, arm 44*a*, contact strip 44*b*, condenser 67 (of very large capacity), to ground. Throughout the 10% of the period, at the end thereof, condenser 67 is discharged through condenser 72 by switch 45. Just prior to time that switch 45 feeds current into condenser 72, the condenser 72 is shorted by switch 46.

Summarizing the operation of parts 66 to 72 inclusive, and their cooperation with switches 44, 45 and 46 it appears that condenser 67, which has very large capacity, is charged in proportion to the integrated amplitude of the four dots of each group, the condenser of course only being charged to a very small proportion of its ultimate capacity whereby its charge is in proportion to the integrated amplitude of all four dots. After condenser 67 has been thus charged, its charge is fed across condenser 72 when switch 45 is closed. Switch 46 shorts and discharges condenser 72 just prior to the time that switch 45 closes. Hence, the charge placed on condenser 72 is in proportion to the average amplitude of the dots of the group.

There are three recorders, a "fine" recorder F, a "coarse" recorder C, and a "differential" recorder D. All three of these recorders have a conventional electron gun G, and also have two recording strips, an upper one and a lower one. Recording is accomplished on one strip during the period that readings are taken from the other one and vice versa. To accomplish this a conventional flip flop circuit FF is driven by end of line signal on wire 35*a*. This circuit FF alternates the potential of its output whenever it receives a new pulse from wire 35*a*. Hence, during the scanning of the first line the flip flop circuit has the polarity shown and the beams of all the recording electron guns 80, 81 and 82 are all directed at the upper strips 83, 84 and 85, whereas the beams of the "reading" electron guns 86, 87, and 88 are all directed to the lower strips 89, 90, and 91. During the scanning of the next line the polarity of the output of the flip flop circuit is reversed and therefore each electron gun beam that was concentrated upon an upper strip has been shifted to a lower strip and each one that was concentrated upon a lower strip has been shifted to an upper strip.

The horizontal plates of the recorders F, C and D are controlled by a very special sawtooth relaxation oscillator 92 with a variable rate of sweep. This oscillator 92 is pulsed by synchronizing pulses from line 35*a* fed through transformer 35*b*. Oscillator 92 produces a potential normally rising linearly at a slow rate but when a potential appears on input line 65*a* the rate of potential rise is increased four fold. Hence, as long as there is no charge on condenser 65 the potential output of oscillator 92 will be slow and steady, but whenever there is a charge on condenser 65 the rate of rise is four-fold greater.

Figure 2:
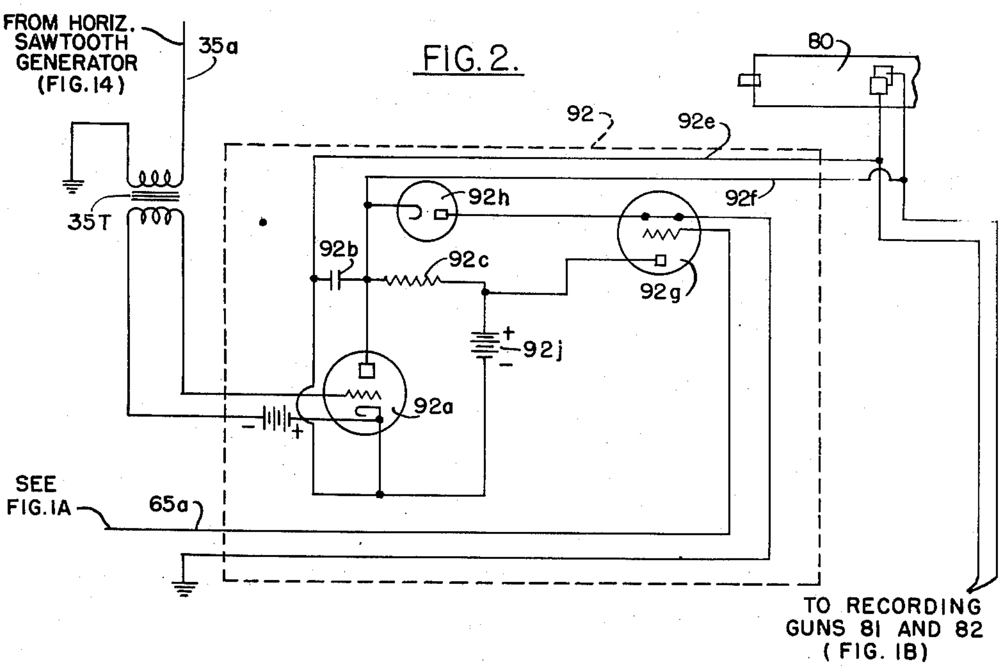
Figure 2 illustrates the details of oscillator 92 shown as a block 92 in Figure 1.

The details of oscillator 92 are shown in greater detail in Figure 2. The synchronizing pulse from transformer 35*t* is impressed on the grid of Thyratron 92*a*. Condenser 92*b*, resistor 92*c* and battery 92*d* cooperate with Thyratron 92*a* to form a conventional saw tooth sweep generator triggered by the output of transformer 35*t*. As is well known the rate of rise of the potential output (on leads 92*e* and 92*f*) depends on the value of resistor 92*c*. When this resistor has high resistance the rise in potential is at a low rate and when this resistor has low resistance the rise in potential is rapid. In my particular embodiment of the invention, resistor 92*c* has high resistance so that normally the rate of potential rise is slow, but when there is a potential on wire 65*a* the triode 92*g* becomes conducting and this triode plus diode 92*h* is shunted across the resistor 92*c*. This effectively lowers the resistance of resistor 92*c* and increases the rate of rise of the potential. Diode 92*h* is one that saturates at a predetermined current, and whenever triode 92*g* becomes conducting the diode 92*h* saturates and thus properly reduces the resistance of resistor 92*c*.

Figures 3, 4:
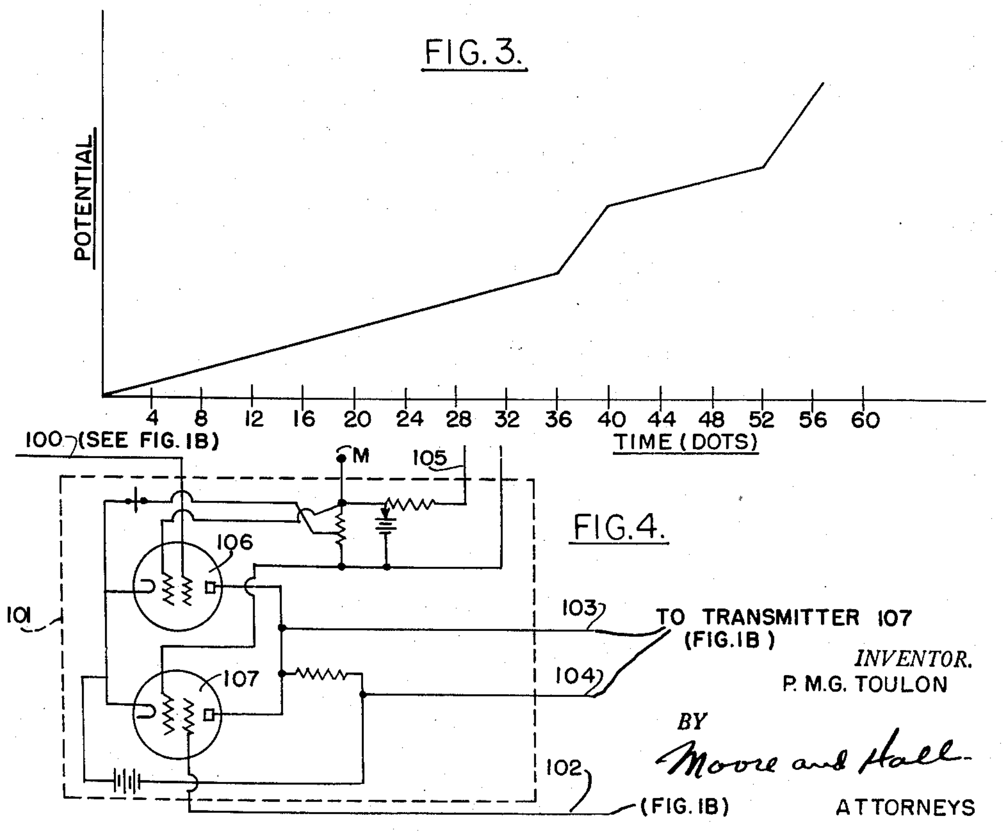
Figure 3 is a curve showing the variations in the potential output of oscillator 92 under certain hypothetical conditions.
Figure 4 illustrates the details of switch 101 of Figure 1.

Figure 3 illustrates the variation in the potential output of oscillator 92 under certain hypothetical conditions. If we assume that dots 1 to 36 inclusive are all of equal amplitude, there is no potential on condenser 65 or on wire 65*a*. Hence, triode 92*g* is not conducting and resistor 92*g* has high resistance. However if we assume that dots 37 and 39 have a different amplitude than dots 36 and 40, then condenser 65 is charged, triode 92*g* becomes conducting and the rate of rise in potential increases. If we assume that dots 40 to 52 inclusive are all equal the curve then rises at a low rate along a line parallel to the curve from dots 1 to 36 inclusive. If the signals vary during the interval between dots 52 to 60 inclusive, the curve rises rapidly along a line parallel to the rise from dots 36 to 40 inclusive.

The input to the grid of gun 80 is passed through delay line 93 which delays the signals by four dots. This compensates for the fact that the charges on condensers 65 and 72 do not appear until the end of each group of four dots. It is therefore apparent that if there is no change in the amplitude during a group of four dots, the signals will be delayed in line 93 and recorded with very close spacing. Wide spacing is not necessary as long as the dots are of the same amplitude and the close spacing tends to render the four dots like one dot of long time duration and unchanging amplitude. However, if during the course of the recording operation a few of the groups of four dots are found to include one or more dots of different amplitude than others in the group, the sweep will be expanded during the recording of these groups since at the ends of these groups a potential will appear on condenser 65 that will expand the recording space. The first dot will arrive for recording (after delay in line 93) only after condenser 65 has already been charged. Thus the information recorded on strip 83 will be compressed as long as the dots of a group are all equal and expanded in those areas where the dots differ.

The length of strip 83 is determined as follows. If a signal is received in which all dots are of equal amplitude the horizontal deflection plates will move the beam across a certain length of strip 83 and the strip is extended beyond this for a limited distance of say 20% of the original distance. Adjacent the end of the strip is placed a collector plate 94.

The invention proceeds on the theory that ordinarily the density of the picture will change only a few times, throughout the course of a scan of a line. If less than one-fifth of all the groups of four dots have a dot of amplitude different from others in the group, then the entire line can be recorded on strip 83. On the other hand if an unusual picture is found which has a large number of variations the beam will pass by the end of strip 83 and impinge upon collector plate 94, which has an effect that appears later.

As stated above, the charge on condenser 72 at any given time is proportional to the average amplitude of the immediately preceding group of four dots. This average value may vary from time to time as the picture density varies but it will naturally be a rather coarse picture involving picture elements four times as long as ordinary dots. This average value is recorded on recorder-reader C and is fed into the recorder grid of electron gun 81. The recording strips 84, 85, 90 and 91 are long enough so that even if oscillator 92 produces its sweep voltage at the steepest possible rate the strips will receive the recordings.

From what has been said it is apparent that unless the recording beam in tube F was deflected off of strip 83 onto collector 94, that the strip 83 contains a complete picture having all of the details. On the other hand the recording in tube C is always a coarse recording, always involving each set of four dots grouped together. Whenever the recording beam remains on strips 83 and 89 the coarse tube C is not effective and the picture is recorded on and read from "fine" recorder F. Whenever the recorder beam strikes collector 94 it feeds current on wire 105 to switch 101. This switch connects the output of fine reader F to output leads 103 and 104 whenever there is no impulse on lead 105. When there is an impulse on lead 105, switch 101 connects the output 100 of coarse reader C to output leads 103 and 104.

The details of switch 101 are shown in Figure 4. When there is no signal on line 105 the first grid of tube 106 is positive and the first grid of tube 107 is negative. Hence tube 106 is conducting thus allowing the "coarse" signal on line 100 to control the signal in the output of tube 106. Tube 107 is idle since its first grid is negative. On the other hand when a negative signal appears on line 105, tube 106 becomes non-conducting and tube 107 becomes conducting, hence the "fine" signal on line 102 controls the output signal on lines 103 and 104.

Figures 8, 9, 11, 12:
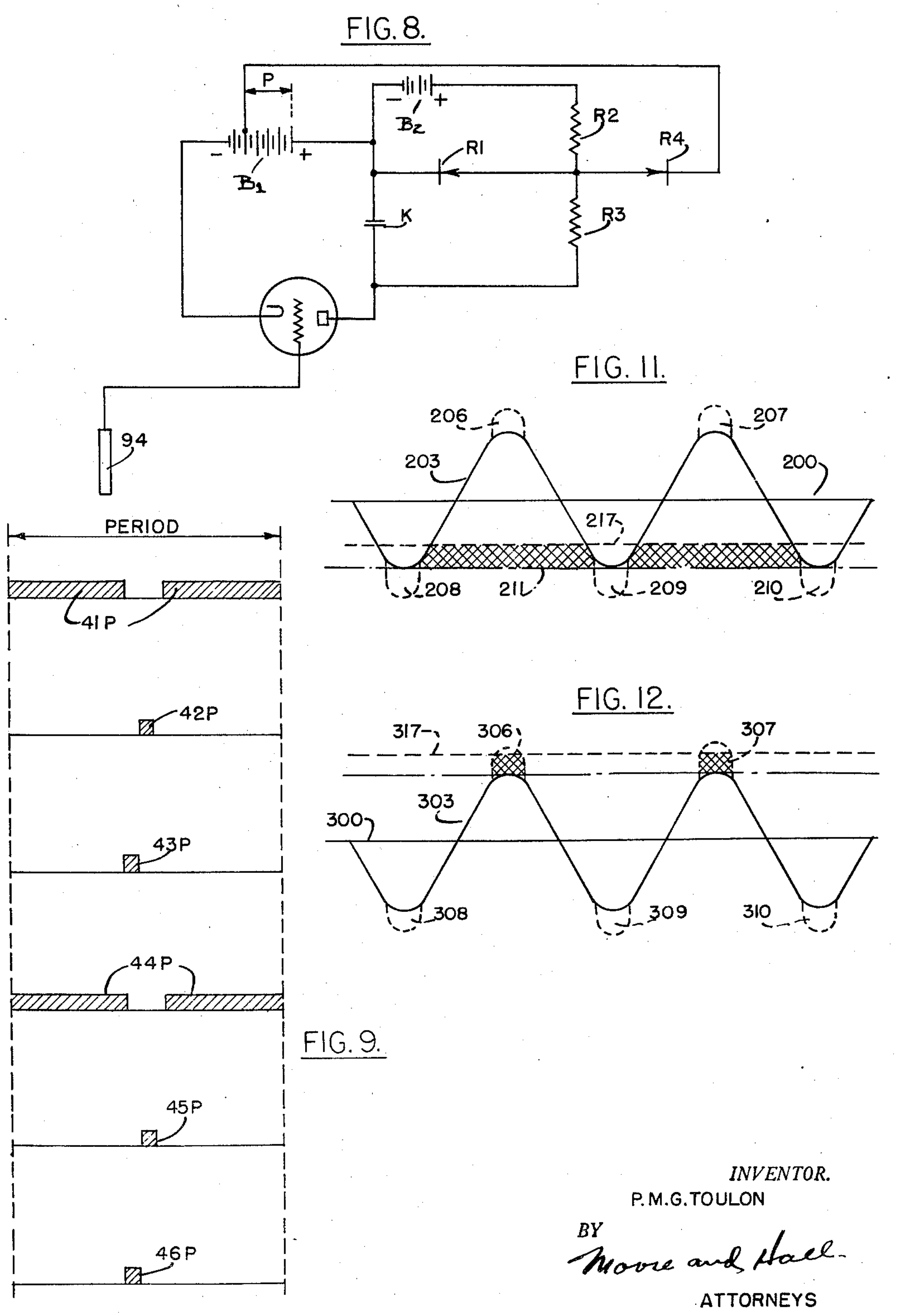
Figure 8 is a schematic diagram of pulse lengthening circuit 105A of Figure 1.
Figure 9 illustrates the waveforms desired from switches 41 to 46 inclusive of Figures 1 and 10.
Figure 11 shows curves illustrative of the operation of the circuit of Figure 10.
Figure 12 is another curve illustrative of the operation of the circuit of Figure 10.

In order to operate switch 101, with best results, it is desirable to extend any pulse coming from electrode 94 for the full length of the scan of the next line. Apparatus for accomplishing this result is placed at 105A in wire 105, and is illustrated in detail in Figure 8. Any suitable pulse lengthening circuit may be employed one of which is shown. In Figure 8, before a pulse arrives from collector 94, the rectifier R1 prevents the upper plate of the condenser K from assuming a negative charge. It short circuits battery B2 through resistor R2. When a pulse is received from collector 94 triode T1 becomes conducting and the condenser K is rapidly charged placing a high negative potential on the lower plate thereof. When the pulse from collector 94 ceases, the condenser discharges exponentially through resistor R3 rectifier R4 until it assumes the potential P of the right hand half of battery B1. It takes a predetermined fixed time for this discharge to occur, hence there was produced wave of predetermined accurate duration. The device of Figure 8 is described in more detail in my U.S. Patent 2,471,253.

The recorder-reader D has a recorder grid subject to the charge on condenser 65. Therefore the recordings on strips 85 and 91 are merely "change" or "no change" recordings. If there is no change in the dots of a group nothing is recorded for that group. If there is a change in amplitude so that condenser 65 is charged, that charge is impressed on the strip 85.

Output leads 103, 104, 106, 35*a* and 35*b* are all fed into transmitter 107 where they are transmitted on a common ultra high frequency carrier in the well known way.

Figure 5:
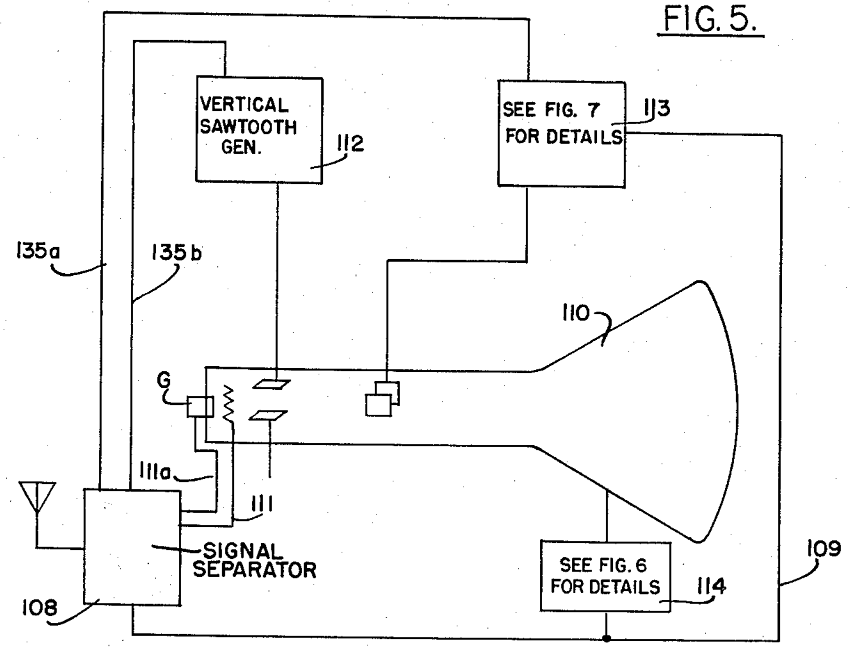
Figure 5 is a schematic diagram of the receiver.

At the receiver shown in Figure 5, there is the conventional detector and the means 108 for separating the modulation signals into channels 109, 111, 135*a* and 135*b*. The signal on line 35*b* at the transmitter is reproduced on line 135*b* at the receiver. The signal on line 135*b* controls conventional vertical saw-tooth generator 112 in the usual way.

Figures 6, 7:
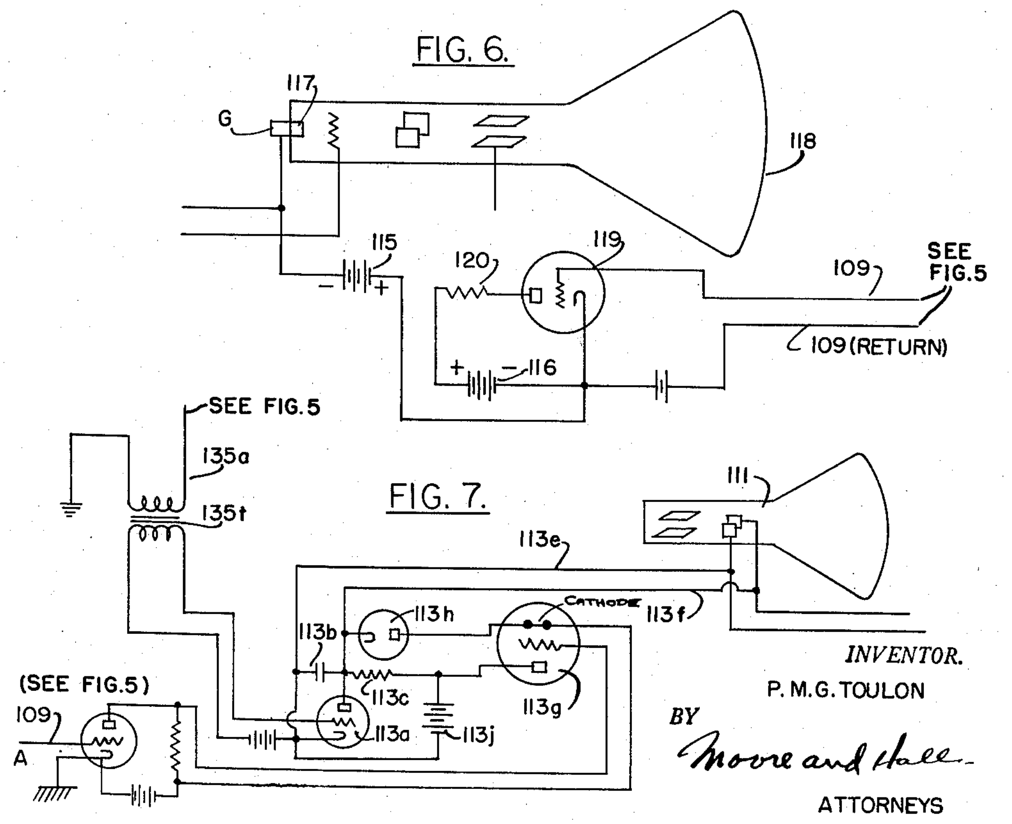
Figure 6 is a schematic diagram of illumination intensity control circuit 114 of Figure 5.
Figure 7 is a schematic diagram of the horizontal sweep generator of the receiver.

The horizontal saw tooth generator 113 of Figure 5 is similar to that of Figure 2 except that the sweep is normally at a rapid rate and changes to a slow rate when there is a pulse on line 109. Generator 113 is shown in detail in Figure 7 where a synchronizing pulse from line 135*a* is impressed on the grid of Thyratron 113*a*. Condenser 113*b*, resistor 113*c* and battery 113*d* cooperate with Thyratron 113*a* to form a conventional saw tooth sweep generator triggered by the output of transformer 135*t*. As is well known the rate of rise of the potential output (on leads 113*e* and 113*f*) depends on the value of resistor 113*c*. When this resistor has high resistance the rise in potential is at a low rate and when this resistor has low resistance the rise in potential is at a high rate. In my particular embodiment of the invention, resistor 113*c* has high resistance so that when it alone is used the potential rise is slow. When there is a potential on wire 109, the grid of triode 113*g* renders this triode non conducting and hence there is nothing to lower the high resistance value of resistor 113*c* and the potential rise (on output leads 113*e* and 113*f*) is at a slow rate. However, in the absence of a signal on line 109 the triode 113*g* is conducting and this triode plus diode 113*h* reduce the resistance across resistor 113*c*. As in the case of diode 92*h* of Figure 2, the diode 113*h* saturates and this has a predetermined effect. Due to the reduction of the effective resistance across resistor 113*c*, the rate of rise of potential becomes very rapid.

The signals on lines 103 and 104 appear on wire 111 and 111*a* at the receiving station and are applied to the grid of the receiving cathode ray tube 110.

It is desirable to increase the intensity of illumination during the periods when the four dots of a group are all equal (the periods when condenser 65 is not charged). The illumination intensity control circuit 114 performs this function, and is shown in detail in Figure 6. In this figure, when there is no potential on line 109, the batteries 115 and 116 of say 10,000 volts each are in series and place 20,000 volts between the cathode 117 and the screen 118. When there is a signal on line 109 the triode 119 becomes conductive and the drop in resistor 120 (which may be 9,000 volts) is subtracted from the original 20,000 volts thus reducing the potential applied to screen 118 to 11,000 volts, reducing the illumination accordingly.

The mode of operation of the invention is as follows. The input video signals are delayed by four dots by the delay line 93, and then fed to the fine recorder F. The horizontal sweep generator 92 moves the recorder beam in tube 80 at a slow rate whenever the four dots of a group have the same amplitude and at a much faster rate when dots in a group of four have different amplitude. Whenever a group of different dots is encountered a pulse is recorded on recorder D. At the end of the line, the flip flop circuit FF reverses the polarity of the vertical deflection plates of tubes F, C, and D, hence the "reader" ends of the tubes now read off the signals previously recorded while the next line is being recorded on the other recording strip (89, 90, 91). While reading is taking place from strip 83, there is also a reading operation taking place from strip 85. The results of these two reading operations are transmitted by transmitter 107 to the receiver of Figure 5. At the receiver the horizontal deflection generator 113 moves the beam normally at a rapid rate but the beam may be slowed down from time to time. Assuming that there are 600 dots in a line, it is apparent that if there is no change in the picture that there will be recorded on strip 83, a total of 150 dots, each representing four dots. During the reading of strip 83 these 150 dots will be sent to the receiver. The sweep produced by generator 113 will be rapid throughout its entire travel and therefore will move a distance corresponding to 600 dots in the same time period that the 150 dots are picked off of strip 83. Circuit 114 will brighten the trace through out the entire line and hence an even line will be produced on the screen of proper intensity.

Let it be assumed that the first 149 groups of dots (four to a group) are all composed of dots of equal amplitude and that there is a variation in the amplitude of the dots of the 150th group. In this case the record on strip 83 would be the same as before except that the 150th group would not appear as a single dot but would appear as four dots spread apart and taking up the same space as the preceding four groups of dots. During the reading operation, which proceeds at constant speed, there would be a total of 153 equally spaced impulses transmitted over lines 103, 104 and received on line 111. There would also be transmitted over line 106 a signal but only during the interval of the last four dots (group #150). At the receiver, the horizontal sweep would move at a rapid rate over the first 596 of its 600 dots. During the time that it passed the first 596 dots it would receive 149 dots which would be spread out since the sweep moves rapidly. During the transmission of group #150, which consists of four dots the rate of the horizontal sweep of cathode ray tube 110 is slowed down to one-fourth its normal rate and during that time the receiver receives the four dots of group #150. Hence, true information is supplied all along the screen of tube 110.

If it is assumed that the number of groups of dots, in which one or more of the group of four differs from the others, is more than 20% of the total number of groups, which is 150, then the beam will be deflected beyond the end of strip 83 and will charge collector 94. The signal on collector 94 will actuate switch 101 and disconnect the output of reader F from transmitter 107, and connect the output of coarse reader C to transmitter 107. Since the coarse signal comprises only 150 dots it is necessary to use the rapid horizontal sweep for cathode ray tube throughout the entire line. This is accomplished by blocking the normally conducting tube 106*a*. The blocking potential is fed from point M of Figure 4. This point remains negative for the length of the sweeping of one line, following each impulse on line 105.

Hence, when a line is composed of groups, the dots of which groups are of equal amplitude (or has not over 20% of its groups with unequal dots) the "fine" recorder F operates to record and reproduce every detail of the picture. In rare cases where there are many variations involved the "coarse" recorder C sends a coarse signal which is spread out along a scanning line at the receiver.

Figure 1B:
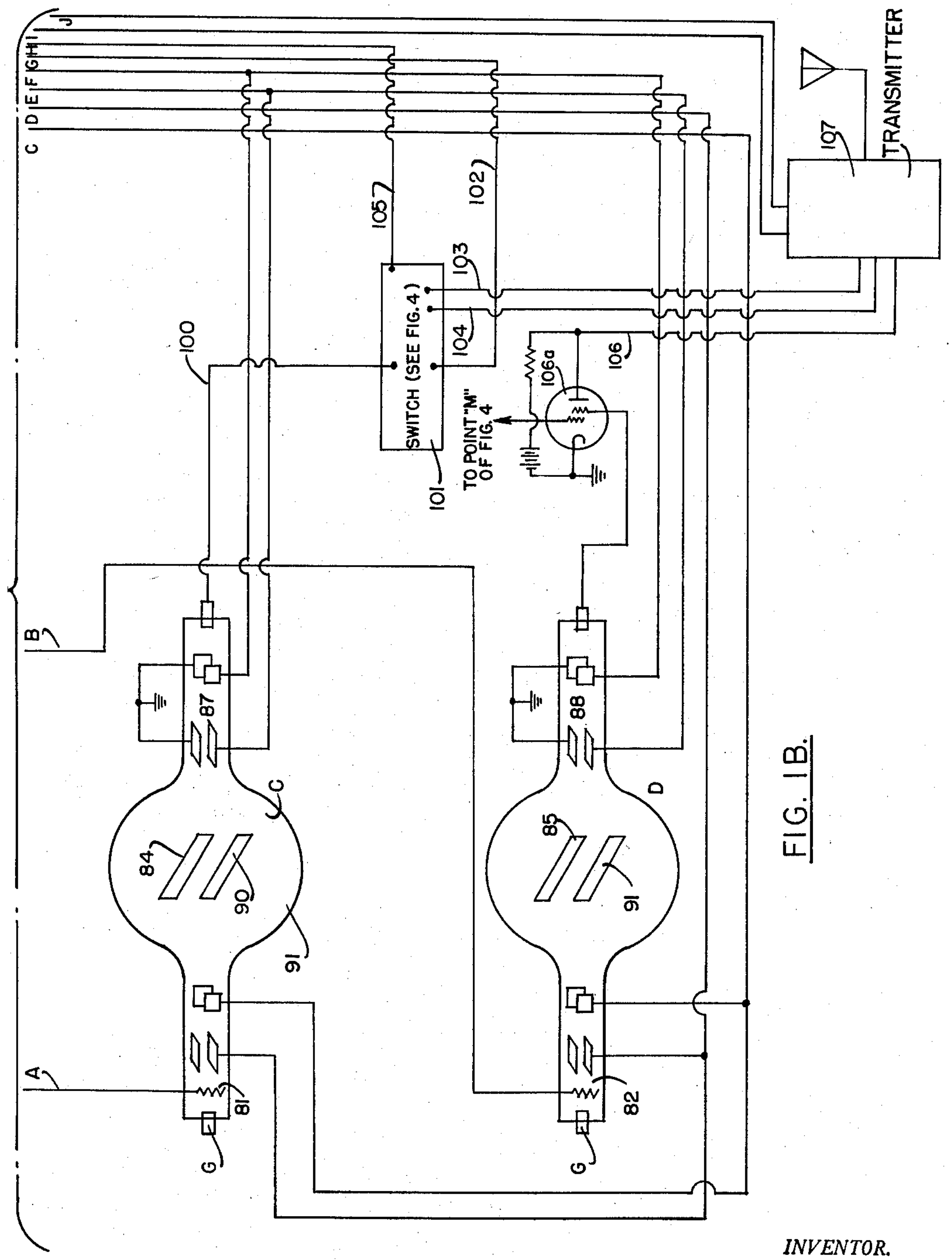
Figure 10:
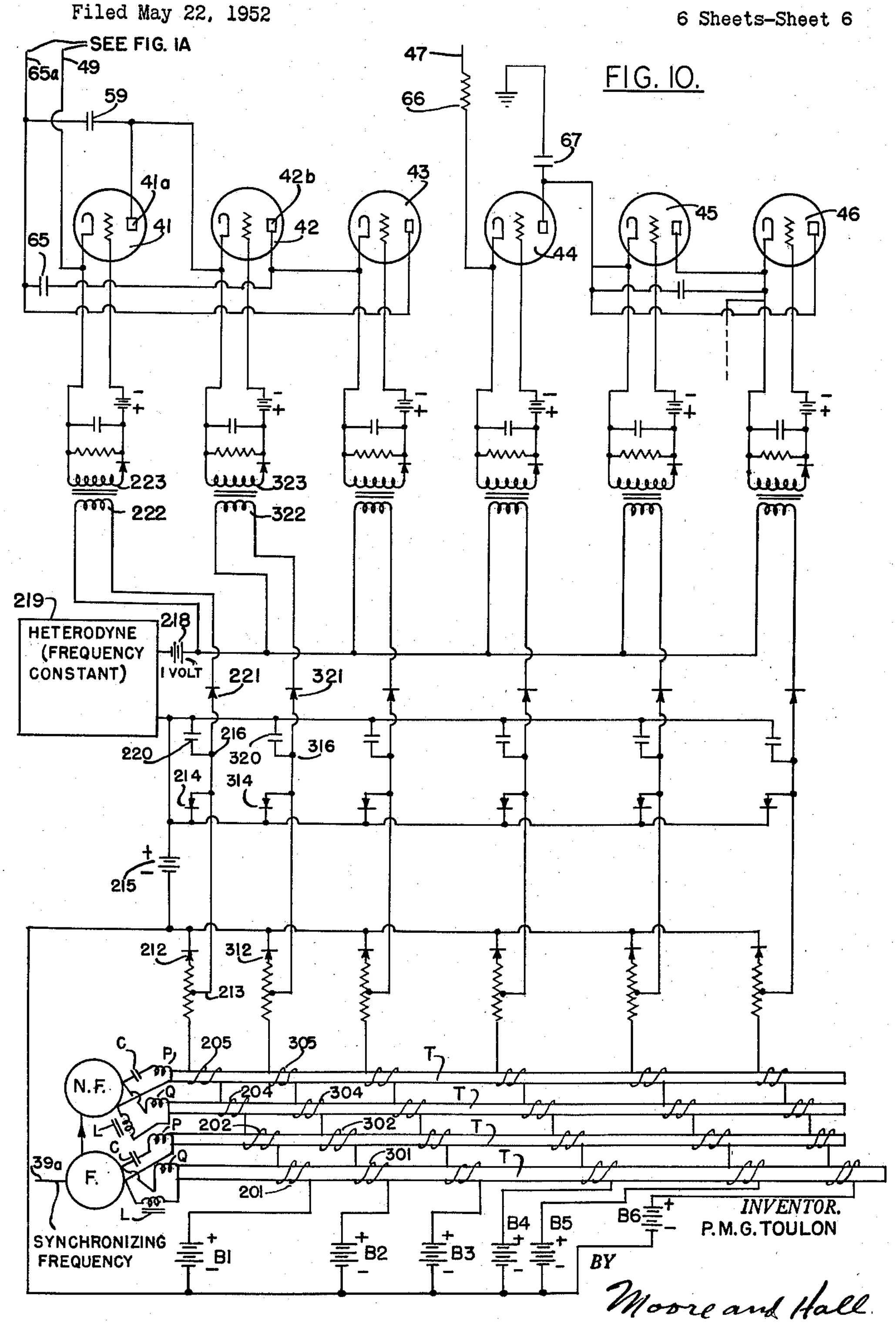
Figure 10 is a schematic diagram of an electrical circuit that may replace mechanical switches 41 to 46 (and their associated motor 40) of Figure 1.

Figures 9 and 10 show an electrical circuit which may be substituted for the motor 40 and the switches 41 through 46 inclusive. Figure 9 illustrates the types of electrical outputs desired from the switches 41 through 46 inclusive. The reference numbers of Figure 10 correspond as close as practical to the complementary parts of Figure 1.

The potential output of triode 41 has the waveform 41*p* of Figure 9. Likewise the potential outputs of triodes 42, 43, 44, 45 and 46 are respectively the waveforms 42*p*, 43*p*, 44*p*, 45*p*, and 46*p*. It is desirable therefore to produce these potentials on the grids of the triodes. The apparatus for doing that is shown in Figure 10.

In Figure 10, oscillator F is fed with signals from multiplier 39 (see Figure 1) over line 39*a*. This oscillator oscillates at the frequency of its input on line 39, and for convenience its frequency will be referred to as F.

There is also an oscillator NF which oscillates at some odd multiple of the frequency F, for example 5F. Each oscillator F and NF has two outputs one of which feeds a coil P through a condenser C and the other of which feeds a coil Q through an inductor L. These circuits are adjusted so that the current in coil P is ninety degrees out of phase with that in coil Q. Each of coils P and Q has a transformer core T and a number of secondary coils on the core as will hereinafter appear.

Figure 11 illustrates by line 200 the zero potential line of the sine wave induced into the two coils 201 and 202 considered together as a unit. This sine wave 203 is modified by the addition of the potential at frequency NF induced in coils 204 and 205. This has the effect of adding peaks 206 to 210 to the sine wave 203. It adds other irregularities to the wave 203 but the others need not be considered. Battery B1 has the effect of lowering the line of zero potential 200 to a new line 211 where only the peaks 208, 209 and 210 have negative polarity. The rectifier 212 has the effect of passing all potentials of negative polarity and therefore the negative peaks 208, 209 and 210 pass through rectifier 212 and are short-circuited to the negative side of battery B1. Hence the negative peaks 208, 209 and 210 are eliminated from wire 213 which is connected to rectifier 214 which is connected through battery 215 to the negative side of battery B1. Therefore, rectifier 214 acts as a limiter and cuts off all potential that exceeds that of battery 215. Therefore, all potential appearing above line 217 of Figure 13 is eliminated, and the potential at point 216 conforms to the cross hatched portion of Figure 11. It is obvious that by proper selection of the turns on coils 201, 202, 204 and 205 it is possible to vary the phase of sine wave 203 (and of the peaks 206 to 210) to any desired point and it is therefo re possible to shift the short area where there is no potential to any desired point. Therefore, in producing the potential for grid 41, the number of turns on coils 201, 202, 204 and 205 are selected so that there is no potential during the last part of each group of four dots. In order that the potential at point 16 may be amplified and applied to the grid of triode 41 with the greatest flexibility, I provide a battery 218 having a potential equal to and opposite to that at point 216 (when it exists). In addition there is oscillator 219 of any suitable frequency (ten megacycles for example) whose peak potential is equal to that of battery 218 (and any potential at 216). If a potential exists at 216 it is neutralized by that at 218, hence the potential of oscillator 219 causes a current to flow through condenser 220, rectifier 221, and transformer primary 222. This current can flow only as long as there is potential at point 216 because in absence of the latter the positive half cycles of oscillator 219 are neutralized by battery 218 and the negative half cycles cannot pass rectifier 221. Therefore, there are half wave impulses on primary 222 which are coextensive in time with the pulses at 216. The current in secondary 223 is rectified and suitably applied to the grid of triode 41 to produce an output of that triode similar to curve 41*p*.

From the foregoing one skilled in the art is able to see how other potentials, such as potential 42$p$ can be produced. However, by way of further example I will explain how to produce potential 42$p$. In Figure 12 assume that line 300 represents zero potential so far as sine wave 303 is concerned. Sine wave 303 results from coils 301 and 302 whereas the coils 304 and 305 produce the peaks 306 to 310 inclusive, the same as in Figure 11. The battery B2 alters the line of zero potential 300 to a new level 311. Rectifier 312 passes all the potential below line 311 thus eliminating it from all further consideration, leaving only the peaks 306 and 307. Battery 215 and rectifier 314 cooperate to act as a limiter to change the peaks 206 and 207 into rectangular waves. This is true since the potential of the battery 215 is equal to the potential difference between horizontal lines 311 and 317. The phase of pulse 42$p$ is controlled by proper selection of the number of turns on coils 301, 302, 304 and 305. The operation of parts 320, 321, 322 and 323 is similar to parts 220, 221, 222, and 223.

The reasoning involved in teaching one how to produce pulses 41$p$ and 42$p$ will also teach how to produce pulses 43$p$, 44$p$, 45$p$ and 46$p$.

I claim to have invented:

1. In a system of signal transmission with reduced bandwidth, storage means having a storage element means producing a signal, recording means for recording said signal on said element, detecting means for detecting whether or not the potential of the signal is changing, means controlled by the detecting means for varying the rate of recording, means for reading the recording at a constant rate, and means coupled to said reading and detecting means and responsive thereto for transmitting to a remote location the result of the reading operation and also the output of the detecting means.

2. In a system of signal transmission with reduced bandwidth, an elongated storage element, means for producing a signal, recording means for recording said signal on said element, detecting means for detecting whether or not the signal is changing in amplitude, means controlled by the detecting means for varying the rate of recording to increase the spread of the recorded data over the length of said element when the signal is changing amplitude, means for reading the recording at a constant rate, means coupled to said reading and detecting means and responsive thereto for transmitting to a remote location the result of the reading operation and also the output of the detecting means, reproducing means at the remote location for reproducing the portion of the transmitted signals representative of said reading operation, said reproducing means including means operated by the portion of the transmitted signals representative of the output of the detecting means to decrease the speed of reproduction when said output indicates changing amplitude.

3. In a system of signal transmission, means producing a first signal, means for dividing said first signal into excerpts of given short lengths, detecting means for detecting whether or not the potential of the signal is constant during the duration of each excerpt, means for producing a signal representative of the entire excerpt, means controlled by the detecting means for transmitting said second signal whenever there is no change in the amplitude of said first signal throughout the period of the excerpt and transmitting a third signal varying in amplitude with amplitude variations in the excerpt when the detecting means indicates an amplitude variation in said first signal during the excerpt.

4. In a system of signal transmission with reduced bandwidth, means producing a signal, means coupled to said signal producing means; for dividing said signal into excerpts of given short duration, detecting means for detecting whether or not the potential of the signal is varying during the duration of each of said excerpts, means for producing signals representative of the several excerpts of the second-named signal including means operated by the detecting means for producing a single impulse representative of the entire excerpt when the excerpt is not varying in amplitude and a plurality of impulses representative of an entire excerpt when the excerpt is varying in amplitude, and means coupled to and responsive to said last-named means for transmitting all of said impulses equally spaced from each other.

5. In a system of television with reduced bandwidth, storage means having an elongated storage element, means for producing a video signal, recording means for recording the video signal on said element, detecting means for detecting whether or not the potential of the video signal is changing, means controlled by the detecting means for varying the extent that portions of the video signal are spread on said element, means for reading the recording at a constant rate, and means coupled to said reading means and to said detecting means for transmitting to a remote location the result of the reading operation as well as the output of said detecting means.

6. The system of claim 5 in which said remote location includes a cathode ray tube having deflection means for deflecting the beam, sweep generator means feeding said deflection means, means for modulating the beam according to that part of transmitted wave representative of the result of the reading operation, and means for modifying the operation of the sweep generator to vary the rate of the sweep of the beam according to variations in that part of the transmitted wave representative of output of the detecting means.

7. In a system of television transmission with reduced bandwidth, means for producing a video signal representative of a given portion of the picture, means for producing another video signal representative of said portion but having less detail than the first-named signal, an output, and switching means responsive to the number of variations in the given portion of the picture to be transmitted for switching the first-named signal to the output when the number of variations is below a predetermined number and for switching the second-named signal to the output when the number of variations is above said predetermined number.

8. In a system of signal transmission with reduced bandwidth, means for producing a signal, first means for recording and rereading a portion of said signal, second means for recording and rereading said portion with fewer variations in amplitude than the first-named recording operation, an output, and means responsive to amplitude variations in said portion for determining which of the rereading operations is fed to said output.

9. In a system of transmission of television signals with reduced bandwidth, means for producing a signal representative of the television picture, first means for storing with all picture detail a portion of the signal, second means for storing said portion with less picture detail than said first-named storing operation, an output, and switching means responsive to the presence or absence of amplitude variations in said portion to switch the first-named storing means to said output when the amplitude of said portion is changing and to switch the second named storing means to said output when the amplitude of said portion is constant.

10. In a system of transmitting a television signal with reduced bandwidth, means for producing a video signal, first means for storing the signal, second means for storing the signal but with less picture detail than with the first-named storing operation, an output, and switching means responsive to the number of variations in the wave for selecting which of said first and second storing means feed said output.

11. A system as defined in claim 10 in which both of said storing means are recorders and in which the second-named means includes means for varying the speed of the recording depending on the variations in the amplitude of the first named signal to speed up the rate of recording when there is no variation in the amplitude and to slow down the recording when the amplitude of the first-named signal is changing.

12. A television set for receiving and reproducing video signals of a type in which the video signals representing limited parts of the picture are of relatively short duration when the picture brilliance over such parts is constant and are of relatively long duration when the picture brilliance over such parts is varying and in which there is a control signal indicating whether the picture brilliance for each such limited part is constant or is varying, comprising means for receiving said video signals and said control signal, means responsive to the received video signals for illuminating successive points along a path until the picture is completed, said second-named means including means controllable to effect any one of a plurality of predetermined speeds at which successive points along said path are illuminated, and switching means responsive to said control signal for operating the last-named means to select a predetermined speed of relatively fast progression from point to point along the picture when the control signal indicates that the picture brilliance of the limited part is constant and to select a predetermined speed of relatively slow progression from point to point along the picture when the control signal indicates that the picture brilliance of the limited part is varying.

13. A television set as defined in claim 12 having means controlled by said control signal for increasing the picture brilliance when the control signal indicates that the picture brilliance over a limited part is constant.

14. A television set as defined in claim 12 in which the switching means has only two switched states to thus effect only two speeds of progression, the ratio of the two speeds of progression being substantially equal to the ratio of the lengths of duration of signals respectively representing a limited part of the picture when moving and when stationary.

15. In a system of transmission with reduced bandwidth, means for producing a video signal representative of part of a picture delayed a predetermined time after the taking of the picture, means for producing another video signal representative of the same part of said picture delayed by said predetermined time but having less picture detail than the first-named signal, an output, means for alternately feeding said signals to said output and including means responsive to variations in the picture for transmitting the first-named signal to the output when the variations in said part are relatively small and for transmitting the second video signal to the output when the variations are relatively large.

16. In a transmission system, means for producing a video signal, means that selects portions of the signal and determines whether or not the potential of the signal is constant over each of said portions, an output, and means controlled by the second-named means for transmitting to said output the video signal representative of each said portion in a shorter time when the potential of the portion is constant than when it is varying.

17. In a television system, means for producing video signals conveying the picture to be transmitted, said means including means for effecting two different time intervals of transmission of the signals that represent selected limited parts of the picture with such time interval being short when the brilliance of the part being transmitted is constant and the time interval of transmission being long when the brilliance of the part varies, means for producing a control signal that indicates whether or not the said time interval of transmission is reduced, means for transmitting said video signal and said control signal, means for receiving the transmitted video and control signals, and reproducing means responsive to said received video and control signals for reproducing the picture and always doing so at one or the other of two speeds and including means to operate it at the slower speed when the control signal indicates that the time interval of transmission has been reduced.

18. In a television system as defined in claim 17, means at the receiver for compensating for the reduced picture intensity when the picture reproduction is at its higher rate comprising means responsive to the control signal for varying the brilliance of the reproduced picture.

19. In a system of wave transmission with reduced bandwidth, means for producing a video signal with both constant amplitude and varying amplitude portions, means for selecting successive parts of said signal and detecting whether or not there was predetermined variation in the amplitude of said signal during the period of such part, the first-named means including means for developing from the first-named signal two signals both of which are delayed for a time period equal to at least the time required for the second-named means to make its determination and one of said signals being a coarse one representative of an entire part examined by the second-named means and the other signal including a high degree of picture detail for at least a portion of such part of the picture, an output, and switching means responsive to whether or not the second-named means indicates a predetermined variation in amplitude of such part for selecting one of said two signals and feeding it to the output.

20. In a television transmitting system, means for producing a video signal, means for examining each of a large number of selected short parts of the video signal and determining if the signal is varying in amplitude during the period of each of the parts, means for delaying said video signal for at least the time required for the second-named means to make its determination, an output, and means responsive to said determination and to the delayed video signal for feeding to said output a coarse signal for such a part of the video signal when the second-named means determines that the signal did not vary in amplitude over such part and for feeding to said output a signal with a high degree of picture detail for at least a portion of the part when the second-named means determines that the signal did vary in amplitude over such part.

21. In a television transmission system, means for producing a video signal, means for examining each of a large number of selected short parts of the video signal and determining if the signal is varying in amplitude during the period of each of the parts, means for delaying the video signal for at least the time required for the second-named means to make its determination, an output, and transmitting means coupled to said examining means and responsive to the result of said determination, said transmitting means including means operative, when there is no amplitude variation in said video signal during the period of a part, to transmit to said output a single pulse derived from said delayed signal and representative of the entire part.

22. In a television transmission system, means for producing a video signal, means for examining each of a large number of selected short parts of said video signal and determining if the signal is varying in amplitude during the period of each of the parts, means for delaying the video signal for at least the time required for the second-named means to make its determination, an output, and means coupled to said second-named means and responsive to the result of said determination, said last-named means being operative, when there was no signal amplitude variation during the period of a selected part, to transmit to said output a single pulse derived from said delayed signal and representative of the entire selected part, said single pulse being transmitted in a shorter time than the period of said selected part.

23. In a television transmission system, means for producing a video signal, means for examining each of a large number of selected short parts of the video signal and determining if the signal is varying in amplitude during the period of each of the parts, means for delaying the video signal for at least the time required for the second-named means to make its determination, an output, means responsive to a determination that there was no signal amplitude variation during the period of a part for transmitting to said output a single pulse derived from said delayed signal and representative of the entire part but in a shorter time than the period of the part, and means for also transmitting to said output a signal representative of said determination.

24. In a television transmission system, means for producing a video signal, means for determining from said signal whether a limited part of the picture is moving or stationary, means for delaying the first-named signal representative of said part at least until the second-named means has made its determination, and means responsive to said determination for deriving from the delayed signal a single pulse representative of the entire limited part if the picture is stationary and for deriving from the delayed signal when the picture is moving a series of spaced pulses representative of said part and which taken together give a high definition of the part.

25. A television receiver for reproducing a picture in response to a received video signal comprising, means for receiving said video signal, a surface on which said picture is displayed, means responsive to said video signal for selectively energizing said surface to thereby describe said picture thereon, means responsive to the characteristics of the picture being described for at times causing a greater portion of said picture to be described in a given interval than at other times, and means for varying the intensity of said energization in accordance with the amount of said picture described in an interval.

26. A television receiver for reproducing a picture from a received video signal comprising, means for receiving said video signal, a surface on which said picture is displayed, means responsive to said video signal for describing said picture on said picture surface by selective energization of said surface, said last-named means being effective to describe a greater portion of said picture in some intervals than at other intervals of the same length in accordance with the characteristics of said picture, and means for varying the intensity of said energization in response to the amount of area described in a given time by said signal.

27. A television set for receiving and reproducing video signals of a type wherein a variable portion of the picture to be transmitted is scanned in a given time and in which there is a control signal for indicating the portion scanned during each said given time comprising, means for receiving said video signals and said control signals, a surface on which said picture is formed, means responsive to the received video signals for energizing successive points along a path on said surface until the picture is complete, said last-named means being controlled by said control signal to vary the number of said successive points successively energized in said given time, and means responsive to said control signal to vary the intensity of said energization in accordance with the number of points energized in said given time.

28. A television receiver for reproducing a picture from a received video signal comprising, means for receiving said video signal, a picture surface, means responsive to said video signal to energize and thereby illuminate successively a plurality of traces over said picture surface until said picture has been completed, means responsive to said video signal for varying the amount of said picture traced by said last-named means in a given time, and means responsive to said video signal for increasing the intensity of said energization when the portion of said picture traced in said given time is increased and to decrease the energization of said trace when the portion of said picture traced in said given time is reduced.

References Cited in the file of this patent

UNITED STATES PATENTS

| | | |
|---|---|---|
| 2,102,139 | Vance | Dec. 14, 1937 |
| 2,202,605 | Schroter | May 28, 1940 |
| 2,516,587 | Peterson | July 25, 1950 |
| 2,629,010 | Graham | Feb. 17, 1953 |
| 2,629,011 | Graham | Feb. 17, 1953 |
| 2,652,449 | Graham | Sept. 15, 1953 |
| 2,740,912 | Graham | Apr. 3, 1956 |
| 2,752,421 | Ross | June 26, 1956 |

FOREIGN PATENTS

| | | |
|---|---|---|
| 433,295 | Great Britain | Aug. 6, 1935 |
| 445,834 | Great Britain | July 3, 1934 |
| 909,949 | France | Jan. 14, 1946 |
| 928,783 | France | June 16, 1947 |

OTHER REFERENCES

Rider Television Manual, vol. 7, Admiral 7–23.